Patented Dec. 31, 1940

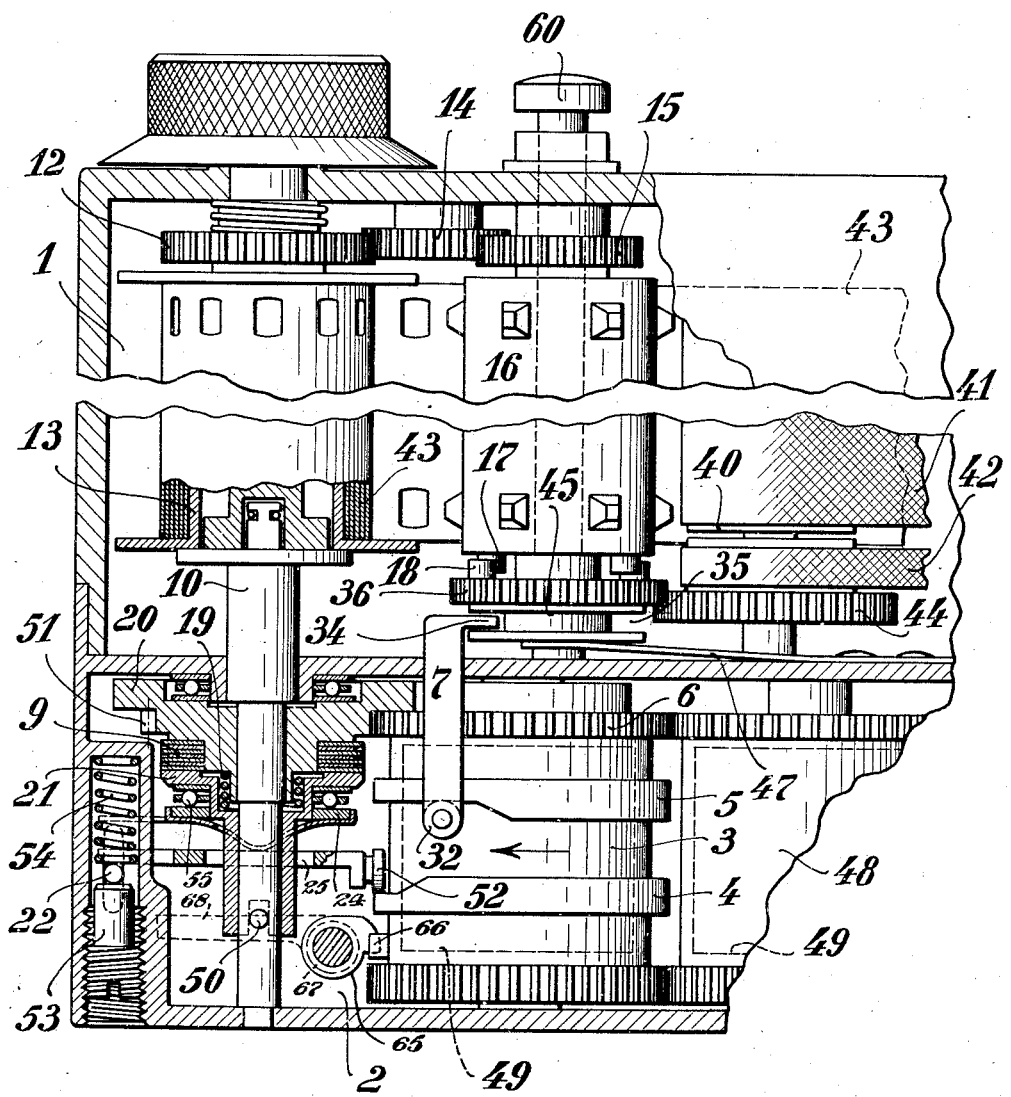

2,227,240

UNITED STATES PATENT OFFICE 2,227,240

TRANSMISSION MECHANISM FOR CAMERAS

Helmut Becker and Erich Filsinger, Wetzlar, Germany, assignors, by mesne assignments, to Frank Dumur, Lausanne, Switzerland Application December 13, 1938, Serial No. 245,360
In Germany December 24, 1937

4 Claims. (Cl. 95—31)

This invention relates to improvements in transmission mechanisms for motor driven cameras of the type disclosed in the pending application Serial Number 132,897 filed March 25, 1937, which shows a roll lm camera having a focal plane shutter, the camera mechanism being driven by a spring motor with a certain improved transmission mechanism between the camera and the motor. The object of the present invention is to provide certain improvements for simplifying the transmission mechanism, reduce the number of parts and obtain a more free, easy and smooth operation which is more efficient and results in material practical advantages as will appear hereinafter.

The invention and its objects will be better understood from the following specification read together with the accompanying drawing which illustrates a portion of the camera with its spring motor and the improved transmission mechanism, parts being in section and parts being broken away.

Referring to the drawing the camera 1 is provided with a focal plane shutter of the type disclosed in U. S. Patent 2,122,671, July 5, 1938, and which is well known in the art. The shutter includes two curtains which are wound up upon a curtain roller indicated at 40. One curtain is indicated at 41, the other curtain by the ribbon 42 which is wound up upon the roller 40 to close the shutter. The film 43 is placed upon a film supply roll, not shown, and is wound up upon a film roller 13 by means of a film transport roller 16 in the usual manner. The shutter roller 40 carries a gear 44 which meshes with another gear 36 on a coupling member 45 slidably supported on the shaft of the film transport roller 16. The coupling member 45 carries pins 18 adapted to engage pins 17 on the roller 16. A spring 47 keeps the parts in normal coupling engagement. The coupling member has an annular groove 35. The parts 17—18 are uncoupled, that is the shutter is released by operation of the shutter release 60.

The spring motor is indicated by two of its drums 3 and 48 having the usual springs 49. The drum 3 carries a cam 5 adapted to engage a roller 32 on a vertically slidable arm 7 which has a hook 34 in engagement with the annular groove 35. The film transport roller 16 carries a gear 15 which engages a gear 14. The latter in turn meshes with a gear 12 on the film roller 13. The latter is rotated by a shaft 10 provided with a pin 50 for driving engagement with a lower clutch member 21. The latter is adapted to be clutched to an upper clutch member 20 by means of a friction disk clutch 9 which includes several disks as shown. The clutch member 20 has a gear 51 which is driven from a gear 6 on the spring motor. The clutch 20—21 is thrown in or out by a lever 25 which is pivoted at 22 and which is actuated by a cam 4 on the spring drum 3. The cam engages a roller 52 on the lever. The pivot 22 of the latter may be adjusted by a screw 53. A spring 54 keeps the pivot in engagement with the screw as shown. The clutch lever 25 supports a clutch plate 24. The clutch members 20 and 21 are separated by a spring 19 when the clutch is thrown out. The motor and transmission mechanism are contained within a casing 2 suitably attached to the camera and a ball bearing 55 is interposed between the clutch plate 24 and the lower clutch member 21.

The operation is as follows: When the camera is ready for an exposure, the springs in the motor are wound up as usual and the parts are in the position shown in the drawing. The shutter is wound up and closed and is held in closed position by the usual pawl and ratchet mechanism, not shown. Likewise it will be understood that the motor is held in wound up position by the usual means, for preventing accidental release of the motor. When an exposure is to be made by hand the shutter release 60 is depressed to uncouple the members 17 and 18. The curtain roller 40 is now free to rotate and the curtains are released and moved to the right in the drawing in the usual manner to make an exposure. After the exposure the film roller 13 is rotated by hand to actuate the film transport roller 16 to advance the film and to rewind the shutter, the coupling members 17 and 18 having been recoupled by the spring 47. There is nothing novel in this operation, but it is to be noted that the vertical lever 7 has been moved up and down together with the coupling member 45 without having any function during this operation.

When it is desired to operate the camera by the spring motor the latter is released as usual and now the drum 3 commences to rotate in the direction of the arrow. The gear 6 of course immediately starts to rotate the gear 51 so that the clutch member 20 rotates idly, the disk clutch 9 not being thrown in at this time. However, as soon as the drum 3 starts moving the cam 5 moves in over the roller 32 on the lever 7 to pull the latter down whereby to move the coupling 45 down together with the members 18 and release the shutter. Immediately thereafter the cam 4 moves in under the roller 52 to raise the clutch lever 25 to throw in the disk clutch 9 and thereby couple the shaft 10 to the upper clutch member 20. The film roller 13 now starts to rotate and through the gears 12, 14 and 15 the film transport roller 16 is rotated to advance the film, and through the coupling 17, 18 and the gears 36 and 44 the shutter is rewound, the coupling 17, 18 having been thrown in by the spring 47 immediately after the exposure.

The parts are so designed that the drum 3 makes one complete revolution for each exposure and after each such revolution the motor is stopped by the usual means, not shown. If one desires to make a number of exposures, one after the other, then one simply does not stop the motor.

The means for releasing the motor may be of the type disclosed in the U. S. Patent No. 2,160,818, June 6, 1939, in which a movable pawl engages a cam on one of the spring drums. The pawl is moved aside to release the motor and is moved back into the path of the cam by a suitable spring. Such a mechanism is indicated diagrammatically in the drawing. The pawl 65 is normally held in the path of a stop or cam 66 on the drum 3 by a spring 67. By operating the handle 68 the pawl is moved aside and the motor released.

The advantage of the invention follows from the construction in which only one clutch 9 is required for the three operations of rewinding the film, advance the film and rewinding the shutter. The construction of the disk clutch 9 is of particular advantage and importance in that the lifting spring 19 causes a separation of the disks immediately after the clutch has been thrown out. This insures certainty of the operation. Were this spring not provided it might happen that the disks might remain in driving engagement due to the oil films thereon. Another advantage is that after the camera mechanisms have been operated and the clutch thrown out, it leaves a certain free play between the parts within the camera and this results in the absence of jamming or binding and the shutter release is soft and free from jars. Another advantage resides in the adjustable pivot for the clutch lever 25. It is thereby possible to regulate the pressure between the disks. This is of importance for the reasons that without such fine regulation the spring motor may rotate so violently that the film may be torn.

The invention is not limited to spring motors but may be used with an electric motor. Again, it is within the scope of the invention to use the disk clutch for instance on the shaft of the film transport roller instead of in connection with the film roller. Other obvious uses and application of the invention are within the scope of the appended claims.

We claim:

1. In a roll film camera, a shutter, means for releasing the shutter, means for simultaneously advancing the film and rewinding the shutter, a motor, an arm for actuating the shutter releasing means, a cam on the motor for operating said arm, a transmission device operatively connected to said advancing and rewinding means and interposed between the latter and said motor, a disk clutch therein, a pivotally supported lever for operating said disk clutch to periodically operatively connect the motor to the said film advancing and rewinding means to operate the same and rewind the shutter, a cam on the motor for actuating said lever subsequent to the actuation of the said arm and a spring for disconnecting the motor and causing separation of the disks in the disk clutch.

2. In a roll film camera, a shutter, means for releasing the shutter, means for simultaneously advancing the film and rewinding the shutter, a motor, means actuated by the motor for operating the shutter releasing means, a transmission device operatively connected to said advancing and rewinding means and interposed between the latter and said motor, a disk clutch therein, means actuated by the motor for operating said disk clutch subsequent to the operation of the shutter release to periodically operatively connect the motor to the said advancing and rewinding means to operate the same, means in said transmission device to disconnect the said motor and means for varying the pressure of the disks in the disk clutch.

3. In a roll film camera, a shutter, means for releasing the shutter, means for simultaneously advancing the film and rewinding the shutter, a motor, an arm for actuating the shutter releasing means, a cam in the motor for operating said arm, a transmission device operatively connected to said advancing and rewinding means and interposed between the latter and said motor, a disk clutch in said device, a pivotally supported lever for operating said clutch to periodically operatively connect the motor to said advancing and rewinding means to operate the same, means on the motor for actuating said lever immediately subsequent to the operation of the said arm and a spring in said transmission device for disconnecting the motor and causing separation of the disks in said disk clutch.

4. In a roll film camera, a shutter, means for releasing the shutter, means for simultaneously advancing the film and rewinding the shutter, a motor, an arm for actuating the shutter releasing means, a cam in the motor for operating said arm, a transmission device operatively connected to said advancing and rewinding means and interposed between the latter and said motor, a disk clutch in said device, a pivotally supported lever for operating said clutch to periodically operatively connect the motor to said advancing and rewinding means to operate the same, means on the motor for actuating said lever immediately subsequent to the operation of said arm, a spring in said transmission device for disconnecting the motor and causing separation of the disks in said disk clutch, a screw supporting said pivoted lever for adjusting the fulcrum thereof and a spring for maintaining the fulcrum of said lever in its adjusted position.

HELMUT BECKER.
ERICH FILSINGER.